United States Patent
Yao et al.

(10) Patent No.: US 11,569,713 B2
(45) Date of Patent: Jan. 31, 2023

(54) AXIAL FLUX MOTOR INCLUDING SYSTEM FOR CIRCULATING COOLANT THROUGH AIR GAP BETWEEN STATOR AND ROTOR

(71) Applicant: GM GLOBAL TECHNOLOGY OPERATIONS LLC, Detroit, MI (US)

(72) Inventors: Jian Yao, Shanghai (CN); Chengwu Duan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 17/081,443

(22) Filed: Oct. 27, 2020

(65) Prior Publication Data
US 2021/0288554 A1    Sep. 16, 2021

(51) Int. Cl.
*H02K 9/19* (2006.01)
*H02K 5/20* (2006.01)
*H02K 9/193* (2006.01)

(52) U.S. Cl.
CPC .............. *H02K 9/193* (2013.01); *H02K 5/20* (2013.01)

(58) Field of Classification Search
CPC ............ H02K 1/32; H02K 9/19; H02K 9/193; H02K 1/20; H02K 5/203; H02K 5/20; H02K 21/24; H02K 1/2793–2798
USPC ............... 310/54, 58, 59, 61, 156.32–156.37
See application file for complete search history.

(56) References Cited

U.S. PATENT DOCUMENTS

| | | | |
|---|---|---|---|
| 6,104,111 A | 8/2000 | Pullen et al. | |
| 6,304,011 B1 * | 10/2001 | Pullen | H02K 21/24 310/58 |
| 2015/0349608 A1 * | 12/2015 | Tsutsumi | H02K 21/24 310/59 |
| 2018/0026500 A1 * | 1/2018 | Woolmer | H02K 21/24 310/43 |
| 2018/0337571 A1 * | 11/2018 | Pal | H02K 1/32 |
| 2020/0072244 A1 * | 3/2020 | Baumann | F04D 29/26 |

FOREIGN PATENT DOCUMENTS

| | | | |
|---|---|---|---|
| DE | 4214483 A1 | 11/1993 | |
| GB | 2261327 A | 5/1993 | |
| JP | 59127556 A * | 7/1984 | ............... H02K 9/19 |

OTHER PUBLICATIONS

JP-59127556-A (English translation) (Year: 1984).*

* cited by examiner

*Primary Examiner* — Thomas Truong

(57) ABSTRACT

An electric motor includes a housing, a shaft, a rotor, a stator, and at least one coolant supply channel. The shaft is rotatably mounted within the housing and has a longitudinal axis. The rotor is fixed to the shaft for rotation therewith. The stator is spaced apart from the rotor along the longitudinal axis of the shaft to yield at least one air gap between the stator and the rotor. The at least one coolant supply channel extends through at least one of the shaft and the stator and is configured to supply coolant flow to the at least one air gap.

19 Claims, 2 Drawing Sheets

AXIAL FLUX MOTOR INCLUDING SYSTEM FOR CIRCULATING COOLANT THROUGH AIR GAP BETWEEN STATOR AND ROTOR

CROSS-REFERENCE TO RELATED APPLICATIONS

This application claims the benefit of Chinese Patent Application No. 2020101075973.4, filed on Mar. 13, 2020. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to axial flux motors including a system for circulating coolant through an air gap between a stator and a rotor.

An electric motor typically includes a housing, a shaft, a stator fixed to the housing, and a rotor fixed to the shaft. Each of the stator and the rotor has a ferromagnetic core. One of the stator and the rotor includes coil windings, and the other one of the stator and the rotor includes a permanent magnet. As current flows through the coil windings, the current generates a magnetic field that interacts with a magnetic field generated by the permanent magnet. This interaction generates a force that causes the rotor and the shaft to rotate.

Two types of electric motors are a radial flux motor and an axial flux motor. In a radial flux motor, the stator and the rotor are spaced apart from one another in a radial direction of the shaft to yield a radial gap between the stator and the rotor, and therefore the magnetic fluxes of the radial flux motor extend radially. In an axial flux motor, the stator and the rotor are spaced apart from one another in an axial direction of the shaft to yield an axial gap between the stator and the rotor, and therefore the magnetic fluxes of the axial flux motor extend axially.

SUMMARY

An example of an electric motor according to the present disclosure includes a housing, a shaft, a rotor, a stator, and at least one coolant supply channel. The shaft is rotatably mounted within the housing and has a longitudinal axis. The rotor is fixed to the shaft for rotation therewith. The stator is spaced apart from the rotor along the longitudinal axis of the shaft to yield at least one air gap between the stator and the rotor. The at least one coolant supply channel extends through at least one of the shaft and the stator and is configured to supply coolant flow to the at least one air gap.

In one example, the rotor includes a permanent magnet that generates a magnetic flux that extends along the longitudinal axis of the shaft.

In one example, the rotor includes a first part and a second part, the stator is disposed between the first and second parts of the rotor in an axial direction parallel to the longitudinal axis of the shaft, and the at least one air gap includes a first air gap disposed between the first part of the rotor and the stator and a second air gap disposed between the second part of the rotor and the stator.

In one example, the at least one coolant supply channel extends through the shaft.

In one example, the at least one coolant supply channel includes a main coolant channel and at least one branch coolant channel. The main coolant channel extends in an axial direction of the shaft through an end thereof. The at least one branch coolant channel extends in a radial direction of the shaft from the main coolant channel to the at least one air gap through an outer radial surface of the shaft.

In one example, the at least one branch coolant channel includes a pair of branch coolant channels disposed on opposite sides of the main coolant channel.

In one example, the at least one coolant supply channel extends through the stator.

In one example, the housing defines an annular coolant jacket disposed radially outward of the stator, and the at least one coolant supply channel includes a main coolant channel and at least one branch coolant channel. The main coolant channel extends axially through the housing from one side thereof to the annular coolant jacket. The at least one branch coolant channel extends radially inward from the annular coolant jacket through the housing and the stator and extends axially through the stator to the at least one air gap.

In one example, the at least one branch coolant channel includes a pair of branch coolant channels disposed on opposite sides of the shaft.

In one example, the electric motor further includes at least one coolant return channel extending through the housing and configured to receive coolant after the coolant flows through the at least one air gap.

In one example, the at least one coolant return channel is axially aligned with the at least one air gap and disposed radially outward of the at least one air gap.

In one example, the electric motor further includes a sump and a pump. The sump is configured to collect coolant flowing through the at least one coolant return channel. The pump is operable to send coolant through the at least one coolant supply channel.

Another example of an electric motor according to the present disclosure includes a housing, a shaft, a rotor, a stator, and at least one coolant supply channel. The shaft is rotatably mounted within the housing and has a longitudinal axis. The rotor is fixed to the shaft for rotation therewith. The rotor includes a first part and a second part. The stator is disposed between the first and second parts of the rotor and is spaced apart from the rotor along the longitudinal axis of the shaft to yield a first air gap between the stator and the first part of the rotor and a second air gap between the stator and the second part of the rotor. The at least one coolant supply channel extends through at least one of the shaft and the stator and is configured to supply coolant flow to the first and second air gaps.

In one example, the first part of the rotor includes a first permanent magnet and the second part of the rotor includes a second permanent magnet. The first and second permanent magnets generate a magnetic flux that extends along the longitudinal axis of the shaft.

In one example, the at least one coolant supply channel extends through the shaft.

In one example, the at least one coolant supply channel includes a main coolant channel and at least one pair of branch coolant channels disposed on opposite sides of the main coolant channel. The main coolant channel extends axially through an end of the shaft. The at least one pair of branch coolant channels extends radially from the main coolant channel to the first and second air gaps through an outer radial surface of the shaft.

In one example, the at least one pair of branch coolant channels includes a first pair of branch coolant channels and a second pair of branch coolant channels. The first pair of branch coolant channels extend radially from the main coolant channel to the first air gap through the outer radial surface of the shaft. The second pair of branch coolant channels extend radially from the main coolant channel to the second air gap through the outer radial surface of the shaft.

In one example, the at least one coolant supply channel extends through the stator.

In one example, the housing defines an annular coolant jacket disposed radially outward of the stator, and the at least one coolant supply channel includes a main coolant channel and at least one pair of branch coolant channels. The main coolant channel extends axially through the housing from one side thereof to the annular coolant jacket. The at least one pair of branch coolant channels extends radially inward from the annular coolant jacket through the housing and the stator and extends axially through the stator in opposite directions to the first and second air gaps.

In one example, the at least one pair of branch coolant channels includes first and second pairs of branch coolant channels disposed on opposite sides of the shaft.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An axial flux motor has a compact package in a high power or torque density. However, cooling an axial flux motor is a challenge due to its compact package. If an axial flux motor is not cooled properly, the axial flux motor may reach high temperatures. At high temperatures, the performance of a magnet in an axial flux motor may be significantly reduced or even permanently demagnetized.

To address this issue, an axial flux motor according to the present disclosure includes a system for supplying coolant to the air gap between the stator and the rotor. In turn, coolant flows through the air gap to cool both the permanent magnet and the coil windings. Supplying coolant flow through the air gap between the stator and the rotor in a radial flux motor yields high drag torque. However, coolant may be supplied to the air gap between the stator and the rotor in an axial flux motor without yielding high drag torque.

Figure 1:
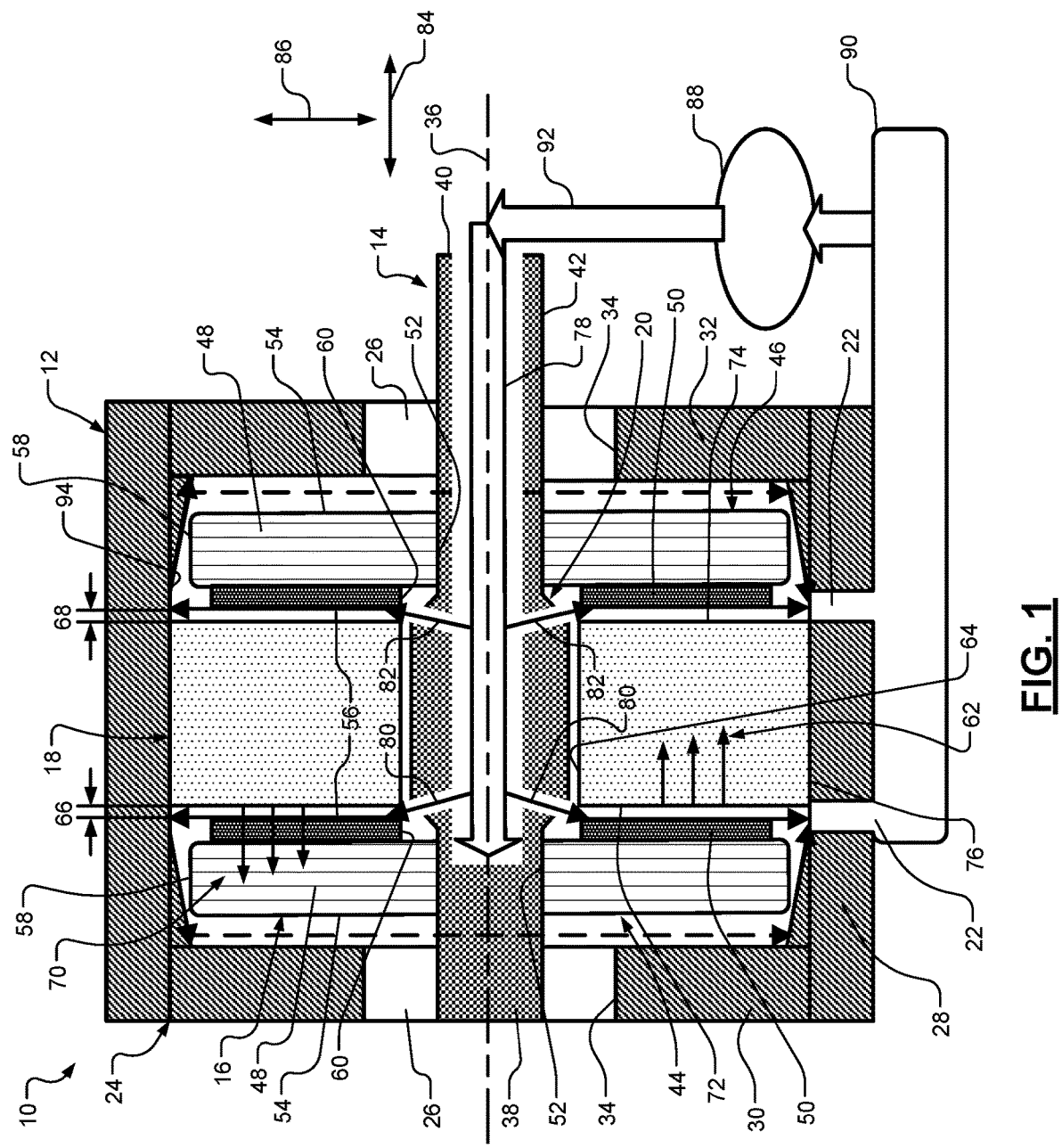
FIG. 1 is a section view of an example of an electric motor according to the principles of the present disclosure.

Referring now to FIG. 1, an electric motor 10 includes a housing 12, a shaft 14, a rotor 16, a stator 18, one or more coolant supply channels 20, and one or more coolant return channels 22. The housing 12 encloses the rotor 16, the stator 18, and at least a portion of the shaft 14. The housing 12 may completely enclose the rotor 16 and the stator 18 except where the shaft 14 and the coolant return channels 22 extend through the housing 12. The coolant return channels 22 may be defined by the housing 12 and/or by a conduit that is inserted into the housing 12.

The housing 12 includes a main body 24 and a pair of bearings 26. The main body 24 may be formed (e.g., casted, molded) from a metal or a plastic. The main body 24 includes a sidewall 28, a first end cap 30, and a second end cap 32. The sidewall 28 may have a cylindrical shape, and each of the first and second end caps 30 and 32 may have a disk shape. The sidewall 28, the first end cap 30, and the second end cap 32 may be integrally formed as a unitary body or formed separately and jointed together.

Each of the first and second end caps 30 and 32 defines a hole 34 that receives and supports one of the bearings 26. The bearings 26 are fixed to the main body 24 using, for example, fasteners and/or an interference fit. The bearings 26 support the shaft 14 while allowing the shaft 14 to rotate relative to the housing 12. The interfaces between the bearings 26 and the housing 12 and between the bearings 26 and the shaft 14 may be sealed to prevent fluid flow therethrough.

The shaft 14 is rotatably mounted within the housing 12 via the bearings 26. The shaft 14 has a longitudinal axis 36, a first axial end 38, a second axial end 40 opposite of the first axial end 38, and an outer radial surface 42 that extends around the circumference of the shaft 14. In the example shown, the first axial end 38 of the shaft 14 is disposed within the hole 34 in the first end cap 30 and does not project beyond (e.g., to the left of) the first end cap 30, while the second axial end 40 of the shaft 14 is disposed outside of the housing 12 does project beyond (e.g., to the right of) the hole 34 in the second end cap 32.

The rotor 16 is fixed to the shaft 18 for rotation therewith. The rotor 16 includes a first part 44 and a second part 46. Each of the first and second parts 44 and 46 includes a ferromagnetic (e.g., iron) core 48 and a permanent magnet 50. The ferromagnetic core 48 has an annular disk shape with a center hole 52 that is sized to receive the shaft 14 and yield a line-to-line, slip, or interference fit between the center hole 52 and the outer radial surface 42 of the shaft 14. The ferromagnetic core 48 is attached to the shaft 14 using, for example, keys, splines, and/or an interference fit between the center hole 52 in the ferromagnetic core 48 and the shaft 14. The ferromagnetic core 48 has a first axial surface 54, a second axial surface 56 opposite of the first axial surface 54, and a radial surface 58. The first axial surface 54 faces away from the stator 18, and the second axial surface 56 faces toward the stator 18.

The permanent magnet 50 has an annular disk shape with a center hole 60 that is sized to receive the shaft 14 and to yield a clearance fit between the center hole 60 and the outer radial surface 42 of the shaft 14. The permanent magnet 50 is attached to the second axial surface 56 of the rotor 16 using, for example, adhesive and/or fasteners. The permanent magnet 50 generates a magnetic flux 62 that extends along the longitudinal axis 36 of the shaft 14. In this regard, the electric motor 10 is an axial flux motor.

The stator 18 has an annular disk shape with a center hole 64 that is sized to receive the shaft 14 and to yield a clearance fit between the center hole 64 and the shaft 14. The stator 18 is disposed between the first and second parts 44 and 46 of the rotor 16. The stator 18 is spaced apart from the first part 44 of the rotor 16 along the longitudinal axis 36 of the shaft 14 to yield a first air gap 66 between the stator 18 and the first part 44 of the rotor 16. The stator 18 is spaced apart from the second part 46 of the rotor 16 along the longitudinal axis 36 of the shaft 14 to yield a second air gap 68 between the stator 18 and the second part 46 of the rotor 16. Each of the first and second air gaps 66 and 68 may be 1 millimeter (mm) in size. Each coolant return channel 22 is axially aligned with one of the first and second air gaps 66 and 68 and disposed radially outward of that air gap 66 or 68.

The stator 18 includes a ferromagnetic core and coil windings. The coil windings in the stator 18 generate a magnetic flux 70 that extends along the longitudinal axis 36 of the shaft 14 and is opposite in direction relative to the magnetic flux 62 generated by the permanent magnet 50. The stator 18 has a first axial surface 72, a second axial surface 74 opposite of the first axial surface 72, and a radial surface 76. The first axial surface 72 faces the first 44 of the rotor 16, and the second axial surface 74 faces toward the second part 46 of the rotor 16. The stator 18 is fixed to the sidewall 28 of the housing 12 using, for example, adhesive, fasteners, and/or an interference fit between the radial surface 76 of the stator 18 and the sidewall 28 of the housing 12.

The coolant supply channels 20 deliver coolant to the first and second air gaps 66 and 68. The coolant supply channels 20 may be defined by the shaft 18 and/or by a conduit that is inserted into the shaft 18. The coolant supply channels 20 include a main coolant channel 78, a first pair of branch coolant channels (or orifices) 80, and a second pair of branch coolant channels (or orifices) 82. The main coolant channel 78 extends in an axial direction 84, or axially, along the longitudinal axis 36 of the shaft 14. In addition, the main coolant channel 78 extends through the second axial end 40 of the shaft 14, but the main coolant channel 78 does not extend through the first axial end 38 of the shaft 14. In this regard, the main coolant channel 78 may be considered a blind hole in the shaft 14.

The branch coolant channels 80 extend radially (e.g. in a radial direction 86) outward in opposite directions from the main coolant channel 78 to the first air gap 66 through the outer radial surface 42 of the shaft 18. The branch coolant channels 82 extend radially outward in opposite directions from the main coolant channel 78 to the second air gap 68 through the outer radial surface 42 of the shaft 18. In the example shown, the branch coolant channels 80, 82 do not extend purely in the radial direction 86. However, the direction in which the branch coolant channels 80, 82 extend is within a small angle (e.g., 15 degrees) of the radial direction 86.

During operation of the electric motor 10, a pump 88 sends coolant (e.g., oil) from a sump 90 to the main coolant channel 78 through a coolant supply line 92. The pump 88 and the sump 90 may be considered part of the electric motor 10 and/or part of a cooling system for the electric motor 10. From the coolant supply line 92, coolant flows axially through the second axial end 40 of the shaft 18 and into main coolant channel 78 of the shaft 14. From the main coolant channel 78, coolant flows radially outward through the branch coolant channels 80, 82 to and through the first and second air gaps 66 and 68, respectively. Rotation of the rotor 16 and the shaft 18 may impart a centrifugal force on coolant flowing out of the branch coolant channels 80, 82, which may cause coolant to flow through the first and second air gaps 66 and 68. Additionally or alternatively, the pump 88 may pressurize coolant flowing through the coolant supply line 92, and this pressurization may cause coolant to flow through the first and second air gaps 66 and 68.

On the side of the electric motor 10 furthest away from the sump 90 (e.g., the upper half of the electric motor 10 as shown in FIG. 1), coolant flows in the axial direction 84 after coolant flows through the first and second air gaps 66 and 68. More specifically, coolant flows axially between the radial surfaces 58 of the rotor 16 and an inner radial surface 94 of the housing 12 and flows toward the first and second end caps 30 and 32 of the housing 12. Coolant then flows radially (e.g., in a downward direction) toward the portion of the sidewall 28 closest to the sump 90 due to, for example, the force of gravity. Once coolant has reached the portion of the sidewall 28 closest to the sump 90, coolant flows axially to the coolant return channels 22.

On the side of the electric motor 10 closest to the sump 90 (e.g., the lower half of the electric motor 10 as shown in FIG. 1), coolant flows directly to the coolant return channels 22 after passing through the first and second air gaps 66 and 68. Coolant flowing through the coolant return channels 22 is collected by the sump 90. Thus, coolant may again be circulated through the first and second air gaps 66 and 68 of the electric motor 10 in the manner described above.

Figure 2:
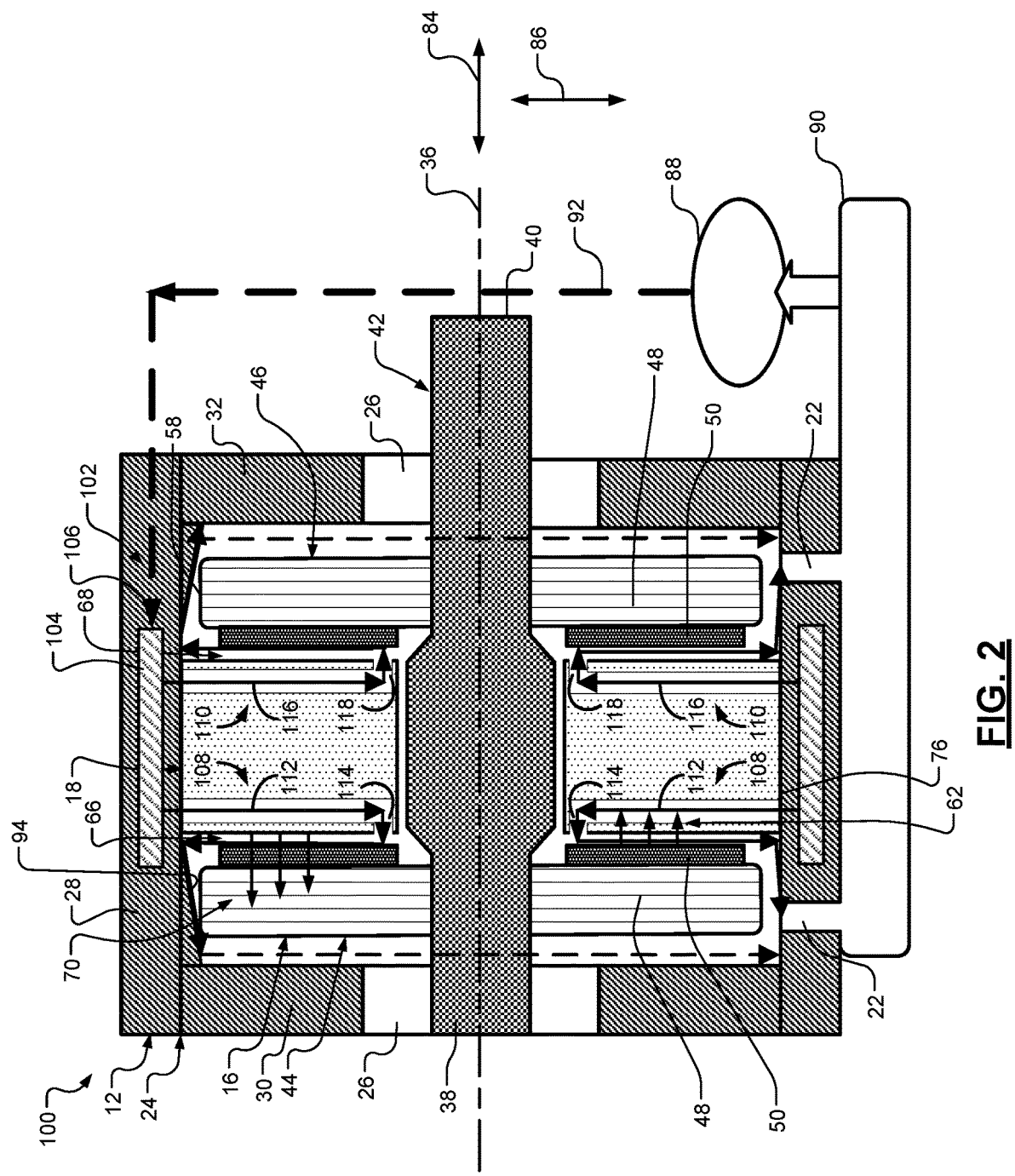
FIG. 2 is a section view of another example of an electric motor according to the principles of the present disclosure.

Referring now to FIG. 2, an electric motor 100 is identical to the electric motor 10 except that the electric motor 100 includes coolant supply channels 102 in place of the coolant supply channels 20, and the electric motor 100 includes a coolant jacket 104. In addition, the coolant return channels 22 are moved closer to the first and second end caps 30 and 32 in order to accommodate the coolant jacket 104. In the example shown, one coolant return channel 22 is aligned with the gap between the first end cap 30 of the housing 12 and the first part 44 of the rotor 16, and the other coolant return channel 22 is aligned with the gap between the second part 46 of the rotor 16 and the second end cap 32 of the housing 12. The coolant jacket 104 is defined by the sidewall 28 of the housing 12 and has an annular or toroidal shape that extends around the entire circumference of the sidewall 28.

The coolant supply channels 102 include a main coolant channel 106, a first pair of branch coolant channels 108, and a second pair of branch coolant channels 110. The main coolant channel 106 extends in the axial direction 84 from the coolant supply line 92 to the coolant jacket 104. The main coolant channel 106 may be defined by the housing 12 and/or by a conduit that is inserted into the housing 12.

Each of the branch coolant channels 108 includes a first portion 112 and a second portion 114. The first portion 112 of each branch coolant channel 108 extends radially inward from the coolant jacket 104 to the second portion 114 of that branch coolant channel 108. The second portion 114 of each branch coolant channel 108 extends axially (e.g., to the left) from the first portion 112 of that branch coolant channel 108 to the first air gap 66 between the stator 18 and the first part 44 of the rotor 16.

Each of the branch coolant channels 110 includes a first portion 116 and a second portion 118. The first portion 116 of each branch coolant channel 110 extends radially inward from the coolant jacket 104 to the second portion 118 of that branch coolant channel 110. The second portion 118 of each branch coolant channel 110 extends axially (e.g., to the left) from the first portion 116 of that branch coolant channel 110 to the second air gap 68 between the stator 18 and the second part 46 of the rotor 16.

During operation of the electric motor 100, the pump 88 sends coolant (e.g., oil) from the sump 90 to the main coolant channel 106 through the coolant supply line 92. Coolant flows axially through the main coolant channel 106 from the coolant supply line 92 to the coolant jacket 104. From the coolant jacket 104, coolant flows radially inward through the first portions 112 of the branch coolant channels 108 to the second portions 114 of the branch coolant channels 108, and through the second portions 114 to the first air gap 66. Similarly, coolant flows radially inward through the first portions 116 of the branch coolant channels 110 to the second portions 118 of the branch coolant channels 110, and through the second portions 118 to the second air gap 68. Rotation of the rotor 16 and the shaft 18 may impart a centrifugal force on coolant flowing out of the branch coolant channels 108, 110, which may cause coolant to flow through the first and second air gaps 66 and 68. Additionally or alternatively, the pump 88 may pressurize coolant flowing through the coolant supply line 92, and this pressurization may cause coolant to flow through the first and second air gaps 66 and 68.

On the side of the electric motor 100 furthest away from the sump 90 (e.g., the upper half of the electric motor 100 as shown in FIG. 02), coolant flows in the axial direction 84 after coolant flows through the first and second air gaps 66 and 68. More specifically, coolant flows axially between the radial surfaces 58 of the rotor 16 and the inner radial surface 94 of the housing 12 and flows toward the first and second end caps 30 and 32 of the housing 12. Coolant then flows radially (e.g., in a downward direction) toward the portion of the sidewall 28 closest to the sump 90 due to, for example, the force of gravity. Once coolant has reached the portion of the sidewall 28 closest to the sump 90, coolant flows axially to the coolant return channels 22.

On the side of the electric motor 100 closest to the sump 90 (e.g., the lower half of the electric motor 100 as shown in FIG. 2), coolant flows directly to the coolant return channels 22 after passing through the first and second air gaps 66 and 68. Coolant flowing through the coolant return channels 22 is collected by the sump 90. Thus, coolant may again be circulated through the first and second air gap 66 and 68 of the electric motor 100 in the manner described above.

In the examples shown in FIGS. 1 and 2, the rotor 16 is in two parts (i.e., the first and second parts 44 and 46), and the stator 18 is a unitary part disposed between the two parts of the rotor 16. In other examples, each of the rotor 16 and the stator 18 may be a unitary part. In other examples, the stator 18 may be in two parts, and the rotor 16 may be a unitary part disposed between the two parts of the stator 18. In these other examples, the electric motor 10 of FIG. 1 is unchanged except for the aforementioned changes in the rotor 16 and the stator 18. And, in the electric motor 100 of FIG. 2, the branch coolant channels 108, 110 also extend through the two stators 18 since the stators 18 are connected to the housing 12 through the interface between the radial surface 76 of the stators 18 and the sidewall 28 of the housing 12. After the coolant flows through the first and second air gaps 66 and 68, it flows back to the coolant return channels 22 along the inner radial surface 94 of the housing 12 due to the force of gravity.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element or layer is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An axial flux motor comprising:
a housing;
a shaft rotatably mounted within the housing and having a longitudinal axis;
a rotor fixed to the shaft for rotation therewith, wherein the rotor includes a first part and a second part;
a stator disposed between the first and second parts of the rotor and spaced apart from the rotor to yield a first air gap disposed between the first part of the rotor and the stator and a second air gap disposed between the second part of the rotor and the stator;

a main coolant channel extending through an end of the shaft in an axial direction parallel to the longitudinal axis of the shaft;
a first pair of branch coolant channels extending through the shaft and from the main coolant channel to the first air gap, wherein the first pair of branch coolant channels are positioned adjacent to the first air gap; and
a second pair of branch coolant channels extending through the shaft and from the main coolant channel to the second air gap wherein the second pair of branch coolant channels are positioned adjacent to the second air gap and the first and second pairs of branch coolant channels are spaced apart along the longitudinal axis of the shaft.

2. The axial flux motor of claim 1 wherein the rotor includes a permanent magnet that generates a magnetic flux that extends along the longitudinal axis of the shaft.

3. The axial flux motor of claim 1 wherein the stator is spaced from the first and second parts of the rotor in the axial direction parallel to the longitudinal axis of the shaft.

4. The axial flux motor of claim 1 wherein the first and second pairs of branch coolant channels extend in a radial direction through an outer radial surface of the shaft.

5. The axial flux motor of claim 1 wherein the first pair of branch coolant channels are disposed on opposite sides of the main coolant channel and the second pair of branch coolant channels are disposed on opposite sides of the main coolant channel.

6. The axial flux motor of claim 1 further comprising at least one coolant return channel extending through the housing and configured to receive coolant after the coolant flows through the first and second air gaps.

7. The axial flux motor of claim 6 wherein the at least one coolant return channel is radially outward of the at least one air gap.

8. The axial flux motor of claim 6 further comprising:
a sump configured to collect coolant flowing through the at least one coolant return channel; and
a pump operable to send coolant through the main coolant channel.

9. The axial flux motor of claim 6, wherein the first air gap has a first axis and the at least one coolant return channel has a third axis that is aligned with the first axis.

10. The axial flux motor of claim 6, wherein the second air gap has a second axis and the at least one coolant return channel has a third axis that is aligned with the first axis.

11. An axial flux motor comprising:
a housing;
a shaft rotatably mounted within the housing and having a longitudinal axis;
a rotor fixed to the shaft for rotation therewith, the rotor including a first part and a second part;
a stator disposed between the first and second parts of the rotor and spaced apart from the rotor along the longitudinal axis of the shaft to yield a first air gap between the stator and the first part of the rotor and a second air gap between the stator and the second part of the rotor; and
at least one coolant supply channel extending through the stator, positioned between the first and second parts of the rotor, and configured to supply coolant flow to the first and second air gaps.

12. The axial flux motor of claim 11 further comprising at least one coolant return channel extending through the housing and configured to receive coolant after the coolant flows through the first and second air gaps.

13. The axial flux motor of claim 11 wherein the first part of the rotor includes a first permanent magnet and the second part of the rotor includes a second permanent magnet, the first and second permanent magnets generating a magnetic flux that extends along the longitudinal axis of the shaft.

14. The axial flux motor of claim 11 wherein:
the housing defines an annular coolant jacket disposed radially outward of the stator; and
the at least one coolant supply channel includes a main coolant channel and at least one pair of branch coolant channels, the main coolant channel extending axially through the housing from one side thereof to the annular coolant jacket, the at least one pair of branch coolant channels extending radially inward from the annular coolant jacket through the housing and the stator and extending axially through the stator in opposite directions to the first and second air gaps.

15. The axial flux motor of claim 14 wherein the at least one pair of branch coolant channels includes first and second pairs of branch coolant channels disposed on opposite sides of the shaft.

16. The axial flux motor of claim 14 wherein coolant flows radially inward from the annular coolant jacket to a first portion of the pair of branch coolant channels within the stator, coolant flows axially outward from the first portion of the pair of branch coolant channels to the first and second air gaps through a second portion of the pair of branch coolant channels, coolant flows radially outward through the first and second air gaps, and coolant flows axially outward from the first and second air gaps to a coolant return channel.

17. An axial flux motor comprising:
a housing;
a shaft rotatably mounted within the housing and having a longitudinal axis;
a rotor fixed to the shaft for rotation therewith, the rotor including a first part and a second part;
a stator disposed between the first and second parts of the rotor and spaced apart from the rotor along the longitudinal axis of the shaft to yield a first air gap between the stator and the first part of the rotor and a second air gap between the stator and the second part of the rotor;
at least one coolant supply channel extending through the stator nd configured to supply coolant flow to the first and second air gaps;
wherein the housing defines an annular coolant jacket disposed radially outward of the stator; and
wherein the at least one coolant supply channel includes a main coolant channel and at least one pair of branch coolant channels, the main coolant channel extending axially through the housing from one side thereof to the annular coolant jacket, the at least one pair of branch coolant channels extending radially inward from the annular coolant jacket through the housing and the stator and extending axially through the stator in opposite directions to the first and second air gaps.

18. The axial flux motor of claim 17 wherein the at least one pair of branch coolant channels includes first and second pairs of branch coolant channels disposed on opposite sides of the shaft.

19. The axial flux motor of claim 17 wherein coolant flows radially inward from the annular coolant jacket to a first portion of the pair of branch coolant channels within the stator, coolant flows axially outward from the first portion of the pair of branch coolant channels to the first and second air gaps through a second portion of the pair of branch coolant channels, coolant flows radially outward through the first and second air gaps, and coolant flows axially outward from the first and second air gaps to a coolant return channel.

\* \* \* \* \*